United States Patent
Liska et al.

Patent Number: 5,818,190
Date of Patent: Oct. 6, 1998

[54] PROGRAMMABLE ELECTRONIC CLUTCH FOR I.S. MACHINE

[75] Inventors: Timothy J. Liska, W. Simsbury, Conn.; Kevin Moriarty, Hampden, Mass.; Joseph F. Ferrigno, Manchester; George Jay Collins, Somers, both of Conn.

[73] Assignee: Emhart Glass Machinery Investments Inc., Wilmington, Del.

[21] Appl. No.: 857,840

[22] Filed: May 16, 1997

[51] Int. Cl.$^6$ .................................................... G05B 11/01
[52] U.S. Cl. ............................................................ 318/560
[58] Field of Search ...................... 65/160, 260; 318/567, 318/569, 600, 601, 3, 603, 638, 640, 652, 49, 85, 560

[56] References Cited

U.S. PATENT DOCUMENTS

| | | | |
|---|---|---|---|
| 3,634,660 | 1/1972 | Moran | 318/568 |
| 4,685,947 | 8/1987 | Liska et al. | 65/29 |
| 4,868,471 | 9/1989 | Braithwaite | 318/567 |

*Primary Examiner*—William M. Shoop, Jr.
*Assistant Examiner*—Kim Locket
*Attorney, Agent, or Firm*—Spencer T. Smith

[57] ABSTRACT

A pusher mechanism comprising a finger assembly, an upper cylinder including a shaft secured to the finger assembly for displacing the finger assembly between retracted and extended positions, housing means supporting the upper cylinder for pivotal displacement, means for pivotally displacing the upper cylinder from a start location to an end location when the finger assembly is extended including a servomotor, a control including profile generating means for generating a profile having a plurality of constant acceleration segments beginning at selected locations and an amplifier for receiving the profile and for driving the servomotor in response thereto, dynamic electronic clutch means for stopping the servomotor to prevent damage to the pusher mechanism when the pivotal displacement of the upper cylinder to the end location is prevented including the amplifier including means for generating a motor current signal, limit logic means including a corresponding plurality of selected constant current limits corresponding to the plurality of constant acceleration segments and logic means for outputting the constant current limit corresponding to a constant acceleration segment when the finger assembly is located at the start location of the segment, means for supplying the logic means with location data for the finger assembly as the extended finger assembly is displaced from the start location to the end location, comparator means for comparing the current limit signal and the motor current signal and for generating a servomotor stop signal in the event that the motor current signal exceeds the current limit signal, and the amplifier further comprising means for receiving the servomotor stop signal and for stopping the servomotor.

11 Claims, 3 Drawing Sheets

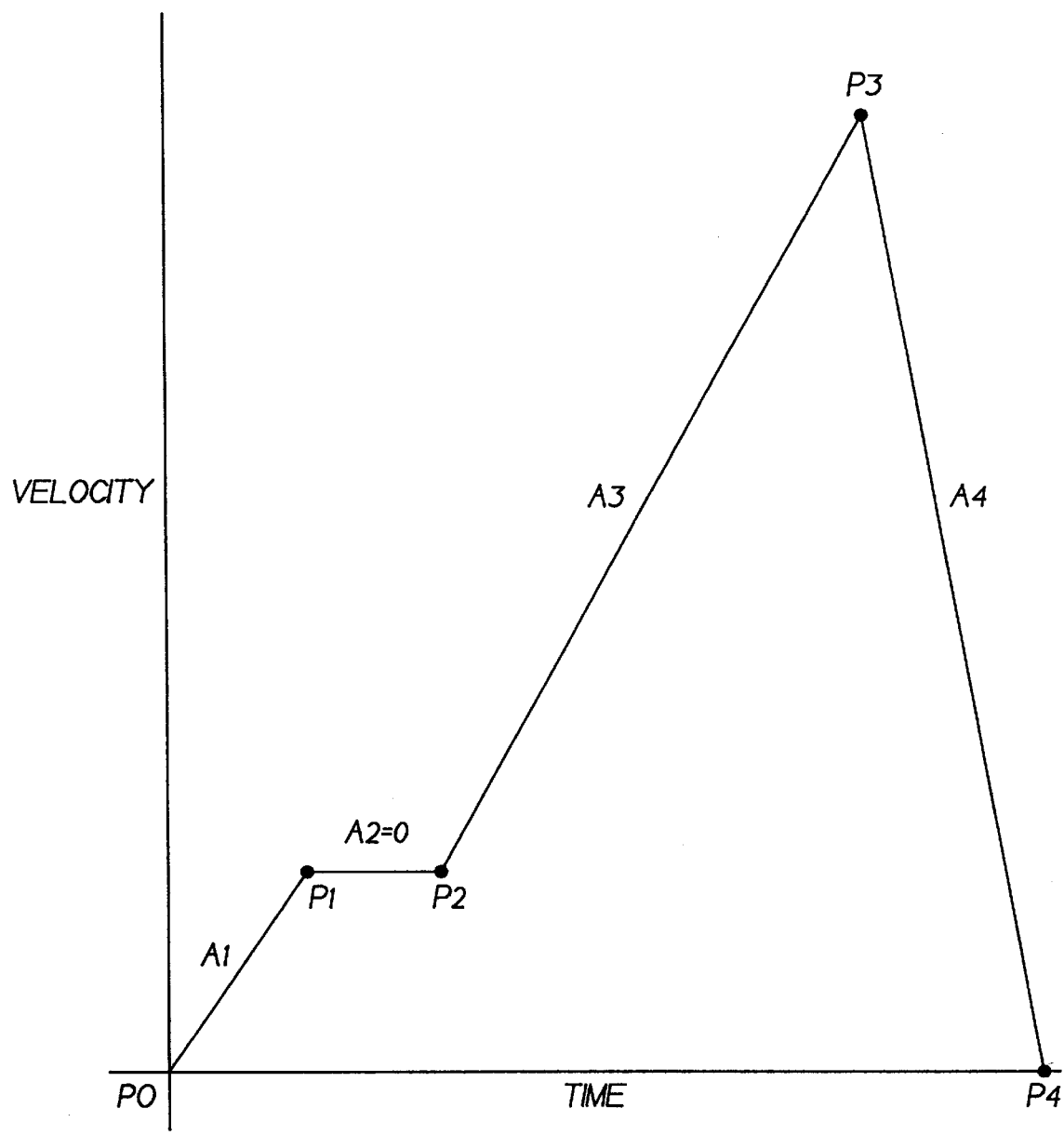

PROGRAMMABLE ELECTRONIC CLUTCH FOR I.S. MACHINE

The present invention relates to individual section (I.S.) machines and, more particularly, to mechanisms for use on these machines which have a mechanical clutch.

BACKGROUND OF THE INVENTION

Individual section (I.S.) machines have a blank side and a blow side. A predetermined amount of molten glass, commonly called a gob, is placed in the blank side where the parison is formed. An invert mechanism transfers the parison to the blow side where the glass container, or bottle, is formed. A takeout mechanism transfers the bottle from the blow side to the deadplate. A pusher mechanism then transfers the bottle from the deadplate to a conveyor mechanism.

Pusher mechanisms conventionally include a mechanical clutch as a means of controlling motor torque. When certain conditions are achieved during I.S. machine operation, the clutch becomes disengaged. This causes the pusher cylinder assembly and the pusher finger assembly to break free of the rest of the pusher mechanism preventing damage to the pusher mechanism and other portions of the I.S. machine. The pusher cylinder assembly and the pusher finger assembly remain free to move independently of the rest of the pusher mechanism until a machine operator, physically resets the clutch. This type of mechanical clutch is expensive and resetting the clutch in this manner is time consuming; and as a result, there is a high cost associated with the use of this mechanical clutch.

OBJECT OF THE INVENTION

It is accordingly an object of the present invention to greatly reduce the costs attendant such a clutch.

Other objects and advantages of the present invention will become apparent from the following portion of this specification, and from the accompanying drawings, which illustrate in accordance with the mandate of the patent statutes, a presently preferred embodiment incorporating the principles of the invention.

BRIEF DESCRIPTION OF THE DRAWINGS

FIG. 3 is a graph illustrating the acceleration curve of the pusher mechanism as it rotates from a start position to and end position and then back to a start position.

BRIEF DESCRIPTION OF THE PREFERRED EMBODIMENT

Figure 1:
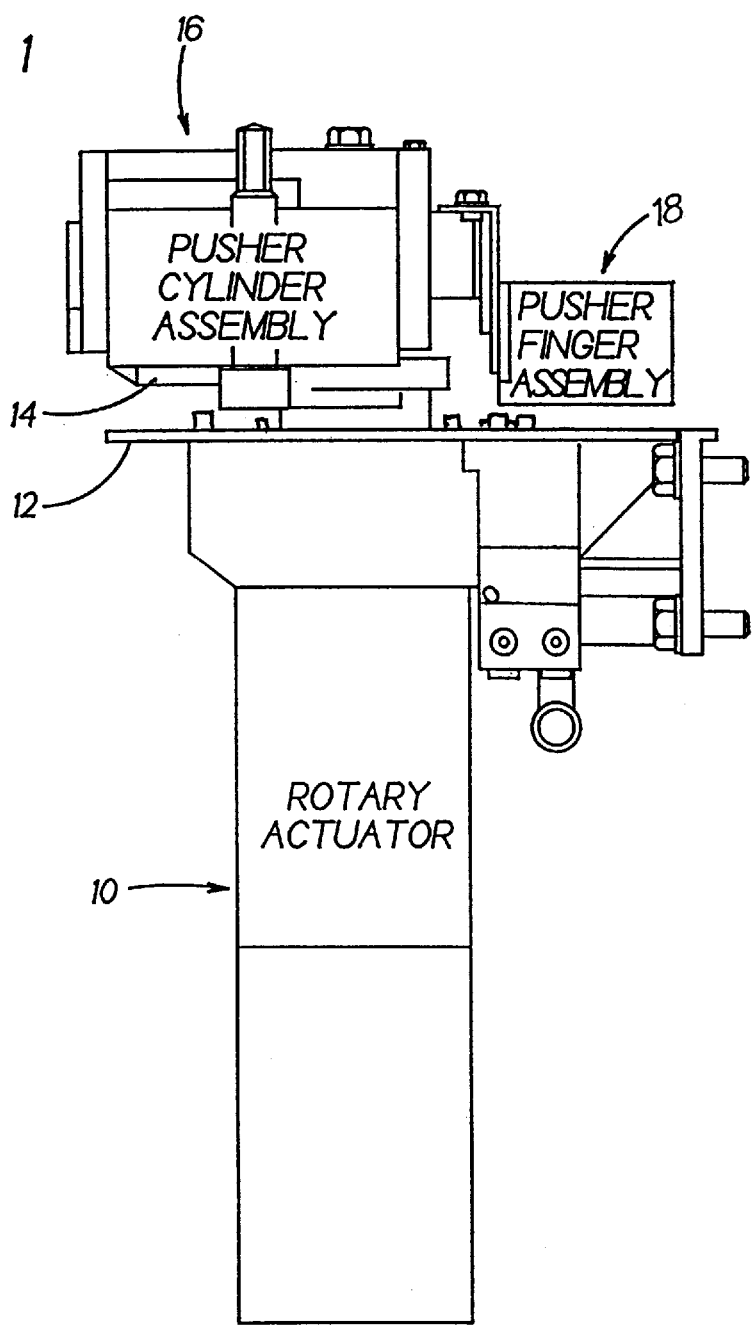
FIG. 1 is a side view illustrating an electronic pusher made in accordance with the teachings of the present invention.

Pusher mechanisms (FIG. 1) transfer glass containers from a deadplate to a conveyor mechanism. The pusher mechanism is driven by a rotary actuator 10 (a servomotor upwardly connecting to a gearbox). which is connected to a cover plate 12. The pusher cylinder mounting plate assembly 14 is attached to this cover plate and acts as the base for the pusher cylinder assembly 16 which advances and retracts the pusher finger assembly 18 between retracted and advanced positions. The pusher mechanism operates by first axially advancing the pusher finger assembly 18 to capture the glass container(s) on the deadplate. Then, the pusher cylinder assembly 16 and pusher finger assembly 18 are rotated from a start position to an end position by the rotary actuator 10 thereby transferring the containers from the deadplate to the conveyor. At this point, the pusher finger assembly 18 is retracted to the retracted position. Then, the pusher cylinder assembly 16 and the pusher finger assembly 18 are rotated back to the start position, where the pusher mechanism awaits the next set of glass containers.

Figure 2:
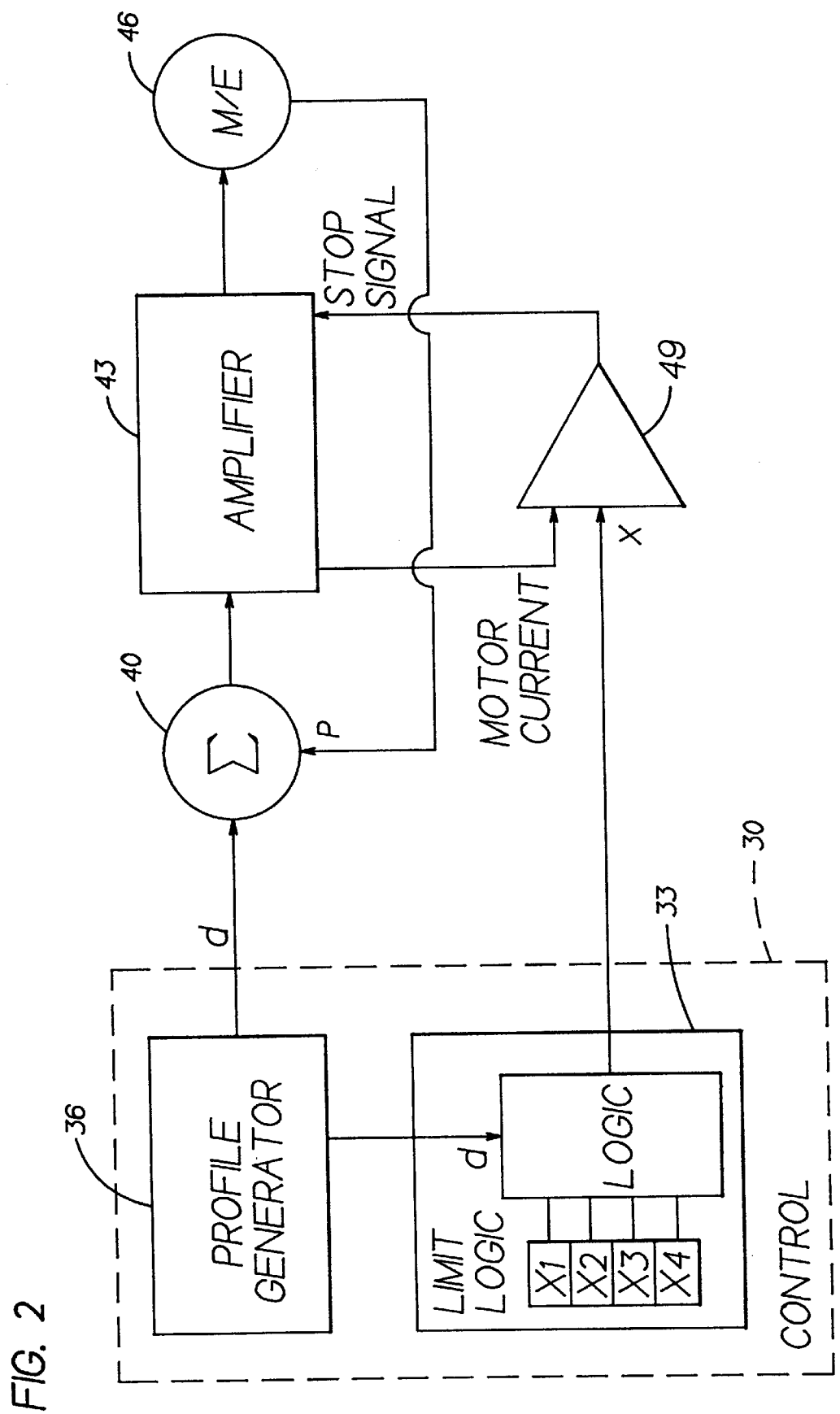
FIG. 2 is a flow chart illustrating the control circuit of that electronic pusher.

FIG. 2 depicts the control circuit that functions as the dynamic electronic clutch. The main control/user interface control 30 has a profile generator 36 which provides a displacement profile (FIG. 3) that uses a plurality of constant acceleration segments (A1,A2,A3,A4) to define the movement of the pusher cylinder assembly 16 and the pusher finger assembly 18 as they rotate from a start position (P0) to an end position (P3) and back to a start position (P0). While the profile generator in the preferred embodiment operates at the displacement level it could also operate on the first (velocity) or second (acceleration) derivatives thereof. Each acceleration segment (A) begins at a defined position and ends at a defined position. For example, when the pusher cylinder assembly 16 and pusher finger assembly 18 rotate from a start position (P0) to position (P1) (following the axial displacement of the finger assembly from its retracted position to its extended position), the acceleration is equal to A1. As the finger assembly continues to rotate from position P1 to position P2, the acceleration equals A2 which equals zero (0). And as the assembly rotates from position P2 to the end position P3, the acceleration is equal to A3. Then, the finger assembly will be retracted back to its retracted position and rotated from the end position P3 back to the start position P4 at a forth constant acceleration A4.

The profile generator 36 provides a demand position d through a summing circuit 40 and an amplifier 43 to the motor/encoder 46 of the rotary actuator with a feedback loop back to the summing circuit 40. The motor current is sent by amplifier 43 to comparator circuit 49.

The finger assembly actual position data d which is supplied to the summing circuit is also supplied to a limit logic circuit 33 located in the control 30 (similar data could also be supplied from the motor/encoder). The user or mechanism supplier enters a plurality of current limit values (X1, X2, X3, X4) into the limit logic circuit 33. These values correspond to a plurality of position dependent maximum allowable currents. The current limit value X which is the value corresponding the position of the finger assembly is transmitted from the limit logic circuit 33 to the comparator circuit 49 where the actual motor current is compared to the current limit value X. If the actual motor current exceeds the maximum allowable current outputted by the limit logic, the comparator will supply a "stop signal" to the amplifier 43 (responsive to the "stop" signal the amplifier will either stop the motor/encoder or reduce the current to the motor/encoder to a level where the motor will not run). If the maximum allowable current exceeds the actual current at a position P, an "on" signal will be sent to the amplifier 43 from the comparator 49.

We claim:

1. A pusher mechanism for an I.S. machine comprising a finger assembly, an upper cylinder including a shaft secured to said finger assembly for displacing said finger assembly between retracted and extended positions, housing means supporting said upper cylinder for pivotal displacement, means for pivotally displacing said upper cylinder from a start location to an end location when the finger assembly is extended including
servomotor means,
a control including profile generating means for generating a profile having a plurality of constant acceleration segments beginning at selected locations and an amplifier for receiving the profile and for driving said servomotor means in response thereto,
dynamic electronic clutch means for stopping said servomotor means to prevent damage to said pusher mechanism when the pivotal displacement of said upper cylinder to said end location is prevented including
said amplifier including means for generating a motor current signal,
limit logic means including a corresponding plurality of selected constant current limits corresponding to said plurality of constant acceleration segments and logic means for outputting the constant current limit corresponding to a constant acceleration segment when said finger assembly is located at the start location of said segment,
means for supplying said logic means with location data for said finger assembly as said extended finger assembly is displaced from said start location to said end location,
comparator means for comparing the current limit signal and said motor current signal and for generating a stop signal in the event that the motor current signal exceeds the current limit signal, and
said amplifier further comprising means for receiving said stop signal and for stopping said servomotor means.

2. A pusher mechanism according to claim 1, wherein said profile is a displacement profile.

3. A pusher mechanism according to claim 2, wherein said profile generating means comprises said means for supplying said logic means with location data for said finger assembly.

4. A mechanism for an I.S. machine comprising
a member movable between start and end locations,
means for displacing said member between said start and end locations including
servomotor means,
a control including profile generating means for generating a profile having a plurality of constant acceleration segments beginning at selected locations and an amplifier for receiving the profile and for driving said servomotor means in response thereto,
dynamic electronic clutch means for stopping said servomotor means to prevent damage to said mechanism when the displacement of said member from said start location to said end location is prevented including
said amplifier including means for generating a motor current signal,
limit logic means including a corresponding plurality of selected constant current limits corresponding to said plurality of constant acceleration segments and logic means to output the constant current limit corresponding to a constant acceleration segment when said finger assembly is located at the start location of said segment,
means for supplying said logic means with location data for said member,
comparator means for comparing the current limit signal and said motor current signal and for generating a stop signal in the event that the motor current signal exceeds the current limit signal, and
said amplifier further comprising means for receiving said stop signal and for stopping said servomotor means.

5. A mechanism according to claim 4, wherein said profile is a displacement profile.

6. A mechanism according to claim 5, wherein said profile generating means comprises said means for supplying said logic means with location data for said member.

7. A mechanism according to claim 6, wherein said member is movable in an arcuate direction from said start location to said end location.

8. A mechanism according to claim 5, wherein said mechanism is a pusher mechanism.

9. A mechanism according to claim 8, wherein said pusher mechanism comprises
a finger assembly,
an upper cylinder including a shaft secured to said finger assembly for displacing said finger assembly between retracted and extended positions,
housing means supporting said upper cylinder for pivotal displacement, and
means for pivotally displacing said upper cylinder.

10. A mechanism according to claim 1, wherein said servomotor means includes a servomotor and a transmission.

11. A mechanism according to claim 4, wherein said servomotor means includes a servomotor and a transmission.

* * * * *